United States Patent

(12) United States Patent
Yamaguchi et al.

(10) Patent No.: US 7,970,060 B2
(45) Date of Patent: Jun. 28, 2011

(54) CONTENTS GENERATOR AND METHOD

(75) Inventors: Koichiro Yamaguchi, Osaka (JP); Hideki Kagemoto, Nara (JP); Akihiro Tanaka, Osaka (JP); Yoshihisa Terada, Chiba (JP)

(73) Assignee: Panasonic Corporation, Osaka (JP)

( * ) Notice: Subject to any disclaimer, the term of this patent is extended or adjusted under 35 U.S.C. 154(b) by 1291 days.

(21) Appl. No.: 11/547,390

(22) PCT Filed: Apr. 6, 2005

(86) PCT No.: PCT/JP2005/006767

§ 371 (c)(1),
(2), (4) Date: Oct. 2, 2006

(87) PCT Pub. No.: WO2005/101843

PCT Pub. Date: Oct. 27, 2005

(65) Prior Publication Data

US 2008/0270799 A1 Oct. 30, 2008

(30) Foreign Application Priority Data

Apr. 15, 2004 (JP) ................................ 2004-120427

(51) Int. Cl.
*H04N 7/12* (2006.01)

(52) U.S. Cl. .................................................. 375/240.26

(58) Field of Classification Search ............. 375/240.26; 348/512

See application file for complete search history.

(56) References Cited

U.S. PATENT DOCUMENTS

| | | | | |
|---|---|---|---|---|
| 6,075,576 | A | 6/2000 | Tan et al. | |
| 7,023,925 | B1 * | 4/2006 | Ward | 375/240.26 |
| 2002/0001309 | A1 | 1/2002 | Saito | |
| 2004/0170199 | A1 | 9/2004 | Golan et al. | |
| 2005/0286431 | A1 | 12/2005 | Saito | |

FOREIGN PATENT DOCUMENTS

| | | |
|---|---|---|
| JP | 11-177943 | 7/1999 |
| JP | 2000-156838 | 6/2000 |
| JP | 2000-244433 | 9/2000 |
| JP | 2003-259312 | 9/2003 |
| WO | 2004/019575 | 3/2004 |

OTHER PUBLICATIONS

Supplementary European Search Report issued Dec. 5, 2008 in Application No. EP 05 72 8464.

Chinese Office Action (along with English language translation) issued Sep. 26, 2008 in the Chinese Application No. 200580011266.5.

* cited by examiner

*Primary Examiner* — Y. Lee
*Assistant Examiner* — Tracy Li
(74) *Attorney, Agent, or Firm* — Wenderoth, Lind & Ponack, L.L.P.

(57) ABSTRACT

Time stamped streams respectively generated by an AV stream generating means and data stream generating means are combined by a time-stamped contents generating means. Consequently, a time-stamped contents stream is generated which synchronizes the processing of an AV stream and multimedia data.

10 Claims, 17 Drawing Sheets

| Data module ID | Data module version | Transmission time (relative value (in seconds) from top of contents) |
|---|---|---|
| 0 | 0 | 0~300 |
| 1 | 0 | 0~120 |
| 1 | 1 | 120~300 |

Fig. 2

| Event message ID | Event message version | Transmission time (relative value (in seconds) from top of contents) |
|---|---|---|
| 0 | 0 | 10 |
| 0 | 0 | 11 |
| 1 | 1 | 100 |

Fig. 13

CONTENTS GENERATOR AND METHOD

BACKGROUND OF THE INVENTION

1. Field of the Invention

The present invention relates to a contents generator including multimedia data and AV data including video and/or audio.

2. Background Information

Electronic publication of digitalized video and audio through broadcast and communications has entered the mainstream in recent years. For example, in broadcast satellite (BS) digital broadcasts and communication satellite (CS) digital broadcasts, video and audio are digitalized and electronically published according to the MPEG2 standard, and other digital broadcasts electronically distribute AV data which include video and audio in the same standard. Furthermore, audiovisual formats for presenting digitally published AV data after it is recorded on a recording medium are also flourishing. For example, AV data received by television are recorded by DVD recorders and HDD recorders, and AV data received by PCs are recorded on HDD. Japanese Unexamined Patent Application Publication No. 2000-156838 discloses art related to a method of recording and presenting AV bit streams according to the MPEG2 standard. More specifically, Japanese Unexamined Patent Application Publication No. 2000-156838 describes art for generating an essentially fixed standard clock based on the clock information previously recorded with the AV bit stream, and providing each packet with a time stamp generated according to the fixed standard clock. Consequently, the AV bit stream can be presented based on the time stamp set in accordance with the fixed standard clock.

Electronic publication of content in which hypertext documents, multimedia data which are image data, and video and audio are distributed together has become increasingly popular. Data broadcasts in BS digital broadcasts are one such example. Data broadcasts in BS digital broadcasts transmit a plurality of data modules of multimedia data so as to conform to the transmission timing of the video and audio. Furthermore, message data called event messages are transmitted in the data broadcast in BS digital broadcasts when notification is desired as to which events occur at a desired clock.

Japanese Unexamined Patent Application Publication No. 2000-156838 focuses only on AV bit streams, and does not mention the handling of multimedia data. Furthermore, among multimedia data are data which require synchronization during processing to present video and audio.

The present invention is art for generating content including AV data and multimedia data based on the condition of presentation after recording, and an object of the present invention is to provide art for generating content capable of synchronizing the presentation of multimedia data with the presentation of video and audio.

SUMMARY OF THE INVENTION

In order to eliminate these problems, a first aspect of the present invention provides a contents generator for generating a time-stamped AV stream from an AV stream which is a packet stream of packetized video and/or audio.

This device is provided with the following means:

- a packetizing means for packetizing at least one multimedia file;
- a time-stamp generating means for generating a time stamp indicating the presentation timing of each packet which has been packetized by the packetizing means based on the multimedia data file transmission time and data transmission bit rate and the AV stream time stamp and/or the multimedia data file transmission clock and AV stream time stamp;
- a multimedia data stream generating means for generating a time-stamped multimedia data stream sharing the time base of the time-stamped AV stream by providing a time stamp generated by the time stamp generating means to each packet corresponding to the time stamp; and
- a time-stamped content stream generating means for generating a time-stamped content stream by combining the time-stamped AV stream and the time-stamped multimedia data stream based on the time stamps of the time-stamped AV stream and the time-stamped multimedia data stream.

This device is capable of synchronizing the presentation of the AV stream and multimedia data. Presentation can be synchronized with the AV stream even when the multimedia data are data modules transmitted over a certain time, and even when the multimedia data are transmitted event messages specifying the clock of a certain moment.

In a second aspect of the present invention, the multimedia data stream generating means of the first aspect receives the multimedia data file transmission sequence settings when there are a plurality of multimedia data files.

The data modules can be presented in the sequence intended by the content producer.

In a third aspect of the present invention, the multimedia data stream generating means determines the transmission sequence of multimedia data files when there are a plurality of multimedia data files for which a transmission time has been specified, and determines whether or not the time indicated by the packet time stamp generated from each multimedia data file is within the transmission time of that multimedia data file when a time-stamped multimedia data stream has been generated in that transmission sequence.

This device eliminates data modules which cannot be presented.

In a fourth aspect of the present invention, the contents generator of the first aspect records clock information indicating the presentation timing of a plurality of packets among all packets of the AV stream, and generates the time stamp of the AV stream based on the clock information. In this device, the time-stamped content stream generating means compares the time-stamp value provided for the packet P1*n* of the time-stamped AV stream and the time-stamp value provided for the packet P2*m* of the time-stamped multimedia data stream, and, when both are equal, changes the clock information and the time stamp value T1*n* of the packet P1*n* of the time-stamped AV stream.

According to this structure, content can be generated without conflict even in the case of identical time-stamp values.

In a fifth aspect of the present invention, the time-stamped content stream generating means of the fourth aspect changes the clock information and the time-stamp value T1*n* of the packet P1*n* of the time-stamped AV stream only relative to the same time base of the content stream.

The clock information indicating the presentation timing of the AV data stream can be matched to the time-stamp even when the time stamp of the AV data stream is changed.

In a sixth aspect of the present invention, the time-stamped content stream generating means of the fourth or fifth aspects extracts the time-stamp values Ta and Tb of the packet Pa directly before and the packet Pb directly after the packet Pn of the time-stamped AV stream, and changes the time-stamp value Tn of the packet Pn based on the time-stamp values Ta and Tb.

In a seventh aspect of the present invention, the time-stamped content stream generating means of the sixth aspect changes the time-stamp value Tn of the packet Pn so as to reduce the difference between the difference ΔTa (ΔTa=Tn−Ta) between the time stamp values of the Packets Pa and Pn of the time-stamped AV stream and the difference ΔTb (ΔTb=Tb−Tn) of the of the time-stamp values of the packets Pn and Pb.

In an eighth aspect of the present invention, the AV stream of any of the fourth to seventh aspects conforms to the MPEG2 standard, and the clock information is a PCR (program clock reference).

In a ninth aspect of the present invention, the time-stamped content stream generating means of the first aspect compares the time-stamp value provided for the packet Pn of the time-stamped AV stream and the time-stamp value provided for the packet Pm of the time-stamped multimedia data stream, and, when both are equal, changes the time-stamp value Tm of the packet Pm of the time-stamped multimedia data stream.

Content can be generated without conflict even when the AV stream and multimedia data stream have identical time-stamp values.

In a tenth aspect of the present invention, the time-stamped content stream generating means of the ninth aspect extracts the time-stamp values Tc and Td of the packet Pc directly before and the packet Pd directly after the packet Pm of the time-stamped multimedia data stream, and changes the time-stamp value Tm of the packet Pm based on the time-stamp values Tc and Td.

In an eleventh aspect of the present invention, the time-stamped content stream generating means of the tenth aspect changes the time-stamp value Tm of the packet Pm so as to reduce the difference between the difference ΔTc (ΔTc=Tm−Tc) between the time stamp values of the Packets Pa and Pm of the time-stamped multimedia data stream and the difference ΔTd (ΔTd=Td−Tm) of the time-stamp values of the packets Pn and Pd.

In a twelfth aspect of the present invention, the multimedia data files of the first aspect include a multimedia data file which specifies a transmission time (hereinafter referred to simply as 'data module'), and a multimedia data file which specifies a transmission clock (hereinafter referred to simply as 'event message'). In this device, when the data module and event message are allocated the same transmission identifier, the multimedia data stream generating means streams the data module in section units of predetermined length which form one or more packets, and, when the transmission clock of the event message is included in the transmission time of any section, changes the time stamp of the event message or the time stamp of all packets of the section.

This device is capable of presenting message data without shifting from a desired time, and prevents violation of the standard in combining data modules. Furthermore, communication bands can be used efficiently by not dedicating a transmission band for the event message.

In a thirteenth aspect of the present invention, a content generating method is executed by the device of the first aspect. This method provides the same effects as the first aspect.

The present invention is capable of synchronizing video and audio output with multimedia data output.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 shows an example of the transmission time of input data modules;

FIG. 13 shows an example of transmission clock of an input event message;

DETAILED DESCRIPTION OF THE PREFERRED EMBODIMENTS

The embodiments of the present invention are described hereinafter with reference to the drawings. In the present invention, AV data includes both video data and audio data, or only video data, or only audio data. Content includes AV data and multimedia data. Multimedia data includes moving images, still images, audio, text and the like. Time stamps may be clock information indicating packet presentation timing. Clock information is not only information representing time in units of minutes and seconds, it may also be the number of oscillations of an oscillator and the like.

First Embodiment

General Structure

Figure 1:
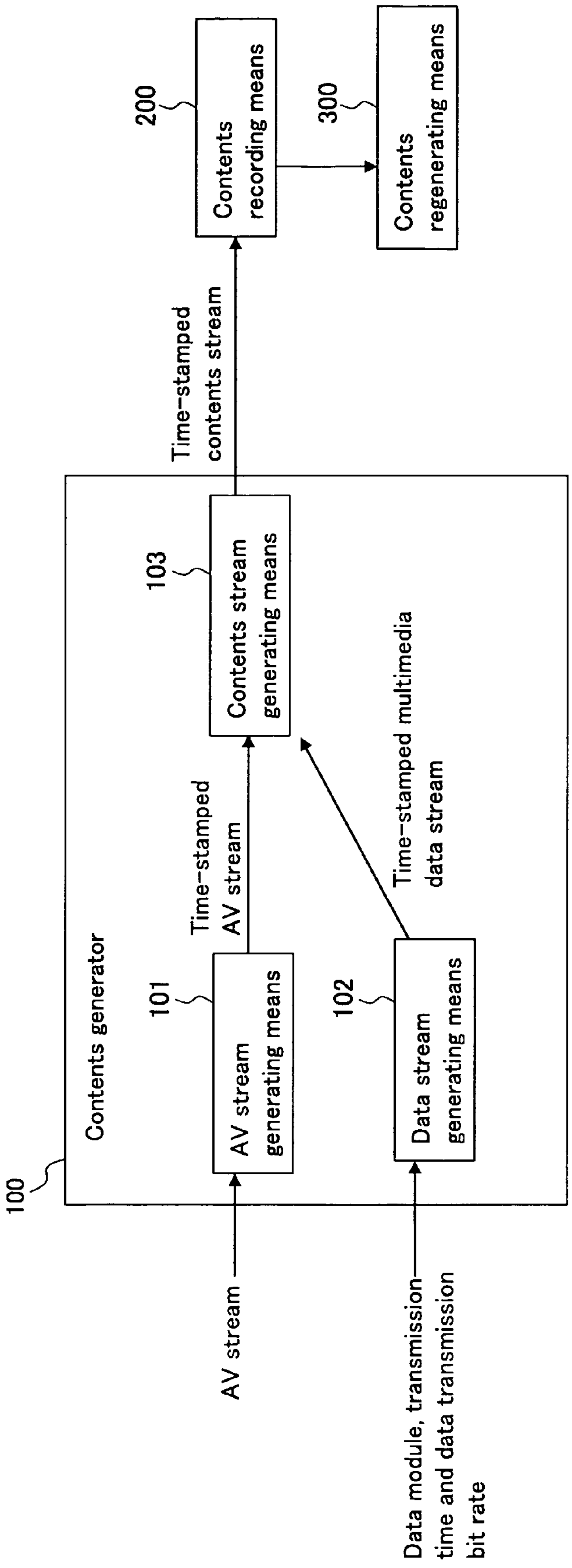
FIG. 1 is a functional structure view of the contents generator of the first embodiment.

FIG. 1 is a functional structure diagram of a first embodiment of the contents generator of the present invention. A contents generator 100 generates a contents stream which includes AV streams and multimedia data streams, and is managed by the content producer. The contents stream is generated so as to synchronize the output of AV data and the output of multimedia data. A generated contents stream is electronically distributed and temporarily recorded by a contents recording means 200, and is presented by a contents presenting means 300. A generated contents stream may also be electronically distributed to the contents presenting means 300 and directly presented without being recorded.

The contents generator 100 may be installed, for example, in a digital TV broadcasting station. The contents recording means 200 and contents presenting means 300 may be provided in the receiver or connected to the receiver of a digital TV viewer. The contents recording means 200 and contents presenting means 300 may be respectively realized by separate computer systems, or may be realized in part or in whole by the same computer system.

Specifically, the contents generator 100 is a computer system including a microprocessor, ROM, RAM, hard disk unit, display unit and the like. A computer program is recorded in RAM or on a hard disk unit. The functions of the contents generator 100 are accomplished through the operation of the microprocessor in accordance with a computer program.

Contents Generator

The structure of the contents generator 100 is described in detail below with reference to FIG. 1. The contents generator 100 includes an AV stream generating means 101, data stream generating means 102, and contents stream generating means 103.

The structure of each unit is described below.

(1) AV Stream Generating Means

The AV stream generating means 101 receives the input AV stream, and provides a time stamp for each packet forming the AV stream. The time stamp is generated so as to specify a timing which essentially matches the timing for presenting each packet. In this example, consider the case in which an AV stream conforming to the MPEG2 standard is input to the AV stream generating means 101. Among the plurality of packets within this AV stream there are recorded PCR (program clock reference) which are clock information specifying the presentation timing of the packets. PCR are recorded in the packets of the AV stream at the rate of at least one PCR approximately every 100 ms. PCR values record the frequency oscillations of 27 MHz±3 ppm as standard clocks.

More specifically, the AV stream generating means 101 extracts the PCR from the AV stream. First, the PCR is extracted, and a counter (not shown in the drawing) is set at the same value as the PCR with a timing essentially identical to the extraction. For example, if the first extracted PCR value is [0], then the counter is set at [0]. The counter values are integrated in accordance with signals from an oscillator (not shown in the drawing) within the AV stream generating means 101. The oscillator oscillates at a frequency slightly shifted from the PCR standard clock, for example, a frequency near 27 MHz. Therefore, if the PCR are recorded periodically, for example, at intervals of 100 ms, the counter integration value is gradually shifted relative to the PCR. This shift is detected, and the frequency of the oscillator is adjusted to minimize the shift. Consequently, the counter integration value based on the oscillator represents a timing which essentially matches the timing for presenting each packet of the AV stream. The AV stream generating means 101 records the counter integration value as a time stamp in the header of each packet of the input AV stream, and outputs the time stamp to the content stream generating means 103.

(2) Data Stream Generating Means

The data stream generating means 102 receives and packetizes the input of one or more multimedia files. In the present embodiment, data for which a transmission time has been specified relative to the time base of the AV stream is considered as a multimedia file (hereinafter referred to as 'data module'). The method of packetizing multimedia files corresponds to the standard of the ARIB (Association of Radio Industries and Business) and MPEG2.

The data stream generating means 102 receives the input of the transmission time and data transmission bit rate of each data module, generates a time stamp, and outputs the time-stamped multimedia data stream to the contents stream generating means 103.

FIG. 2 shows an example of the transmission times of input data modules. The transmission time specifies a range of time in the time base of the AV stream. In this example, the data module transmission time is specified by specifying the relative time in units of seconds using the top of the AV stream as a reference. For example, the transmission time of the data module ID [0] is 300 seconds from the start of the AV stream. Similarly, the transmission time of the data module ID [1] is 120 seconds from the start of the AV stream for version [0]. The transmission time of the data module [1] version [1] is the 180 seconds between 120 and 300 seconds from the start of the AV stream. The combination of both the data module ID and data module version specifies the data module.

The time stamp is generated so as to indicate the timing for synchronizing each packet of the AV stream and each packet of the data module. Specifically, the value of the top packet of one data module is represented by the equation below.

(Top packet value)=(initial time-stamp value of the AV stream)+(value which represents the relative time of the transmission start time of the data module from the start of the AV stream transmission)

The maximum value of a time stamp provided for one data module is represented by the equation below.

(Time stamp maximum value)=(initial time-stamp value of the AV stream)+(value representing the relative time of the transmission end time of the data module from the start of the AV stream transmission)

For example, consider the case in which the AV stream has an initial time-stamp value of [0], and time stamps are provided for data modules transmitted during the 300 seconds from the start of the AV stream. The data modules are sequentially provided with time stamps increasing from the [0] starting Ti to 300. The change interval Ti of the time-stamp value is fixed, and is calculated by the equation below.

$$Ti=(\text{packet size})\div(\text{data transmission bit rate})$$

In the present example, the data transmission bit rate is identical for each data module to facilitate the explanation. The packet size conforms to the standard of the generated contents stream, for example, 188 bytes or 204 bytes in the case of a digital television broadcast content stream.

Figure 3:
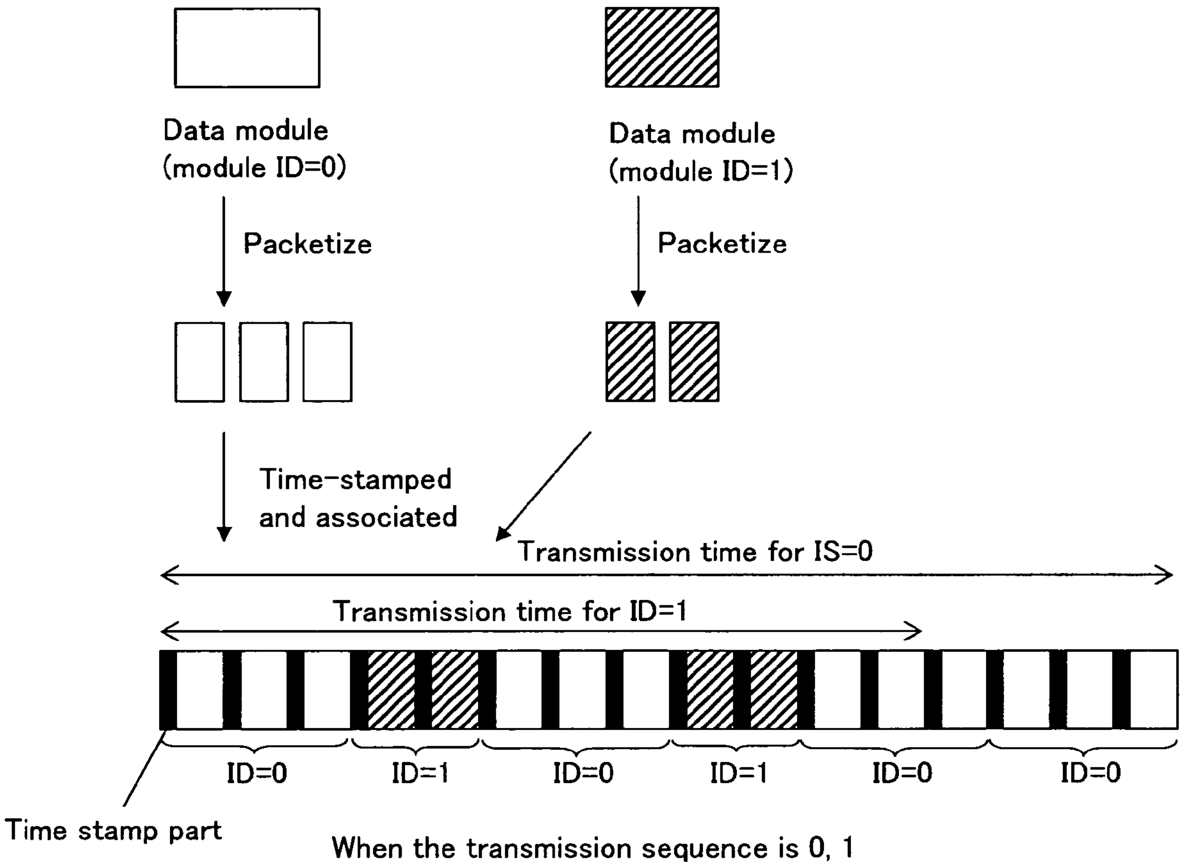
FIG. 3 is a conceptual drawing of a generated time-stamped multimedia data stream.

FIG. 3 is a conceptual view of a generated time-stamped multimedia data stream. In this case, a plurality of data modules are packetized in a single multimedia data stream. the multimedia data stream is generated such that each data module is repeatedly transmitted by the Carousel method. A time stamp having a Ti interval value is provided in the header of each packet.

When the transmission times of a plurality of data modules overlap, the data module transmission sequence is determined by some method, and a time stamp in accord with the sequence is provided. The drawing shows a case in which the transmission times of two modules (ID=0, 1) overlap, and both are transmitted in the sequence of data module ID [0], [1]. In this case, time stamps are first provided for the packets of the data module (ID=[0]). When time stamps have been provided for all packets corresponding to one part of the data module (ID=[0]), time stamps are provided for all packets corresponding to one part of the next data module (ID=[1]). The data stream generating means 102 determines whether or not the time stamp exceeds the data module transmission end time when providing the time stamps to the packets of the data module. When providing time stamps repeatedly for a plurality of data modules in accordance with their transmission sequence, if any transmission time of a data module, in this example data module (ID=[1]), ends quickly, then thereafter, time stamps are provided for packets of other data modules (ID=[0]).

(3) Content Stream Generating Means

The content stream generating means 103 generates a content stream by combining the AV stream and multimedia data stream based on the time stamps. The content stream generating means 103 electronically distributes the generated contents stream to the contents storage means 200 over a broadcast network, communication network or the like.

Figure 4:
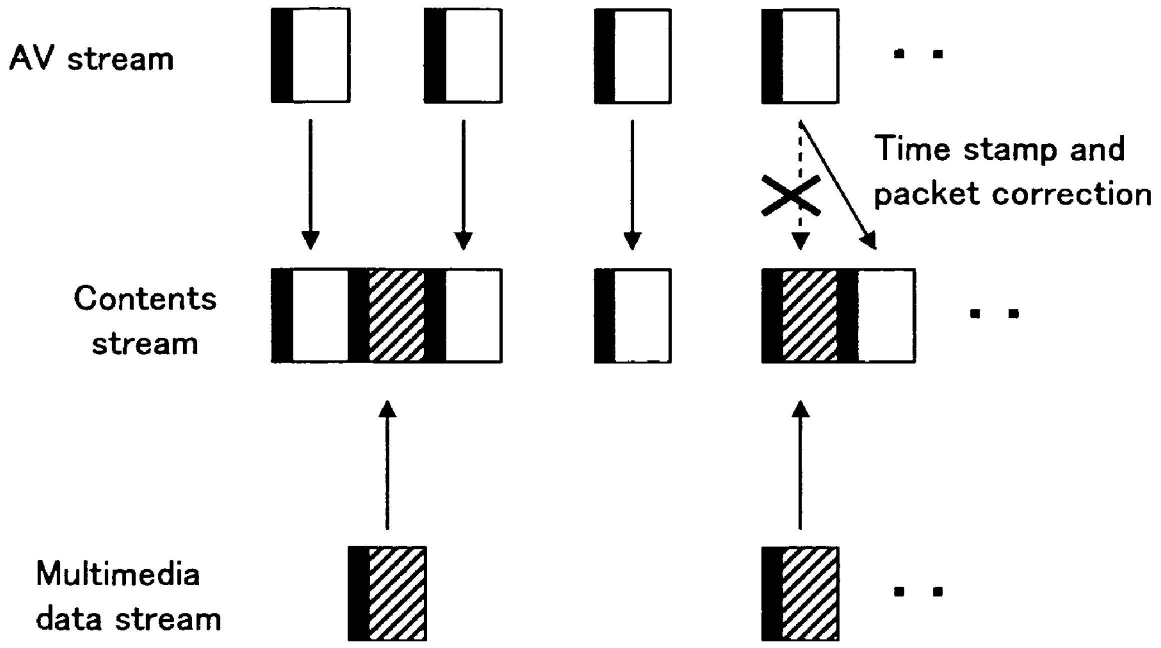
FIG. 4 is a conceptual drawing showing the contents stream generating method.

FIG. 4 is a conceptual illustration showing the content stream generation method. The contents stream generating means 103 generates a single contents stream by listing the packets of the AV stream and the multimedia data stream sequentially from the packet having the lowest time stamp value. When packets of both streams have identical time stamp values, one or the other of the time stamp values is rewritten. In FIG. 4, shows an instance in which the time stamp value is rewritten for a packet of the AV stream.

Figure 5A:
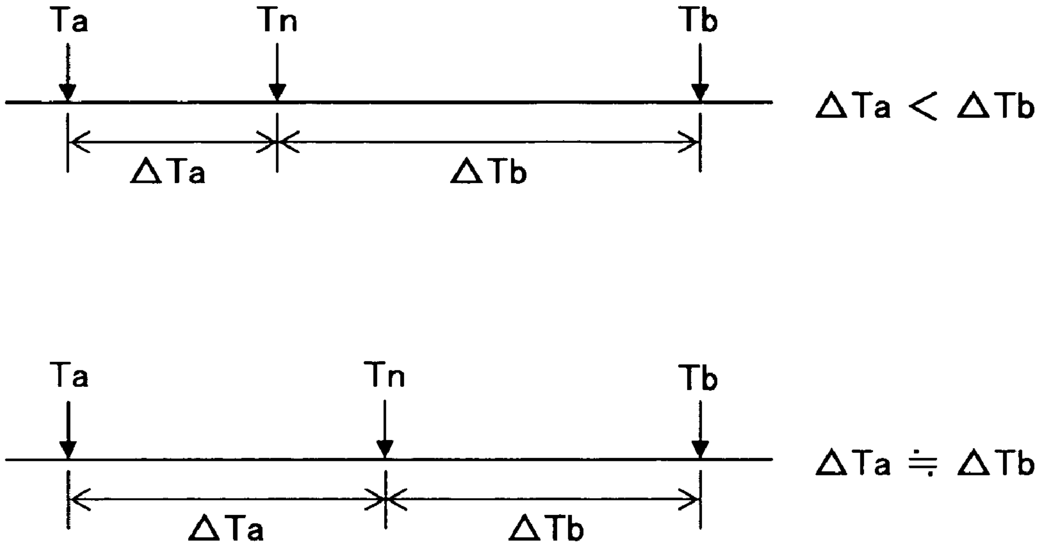
FIG. 5A illustrates the method of changing the time-stamp value when (ΔTa<ΔTb)
Figure 5B:
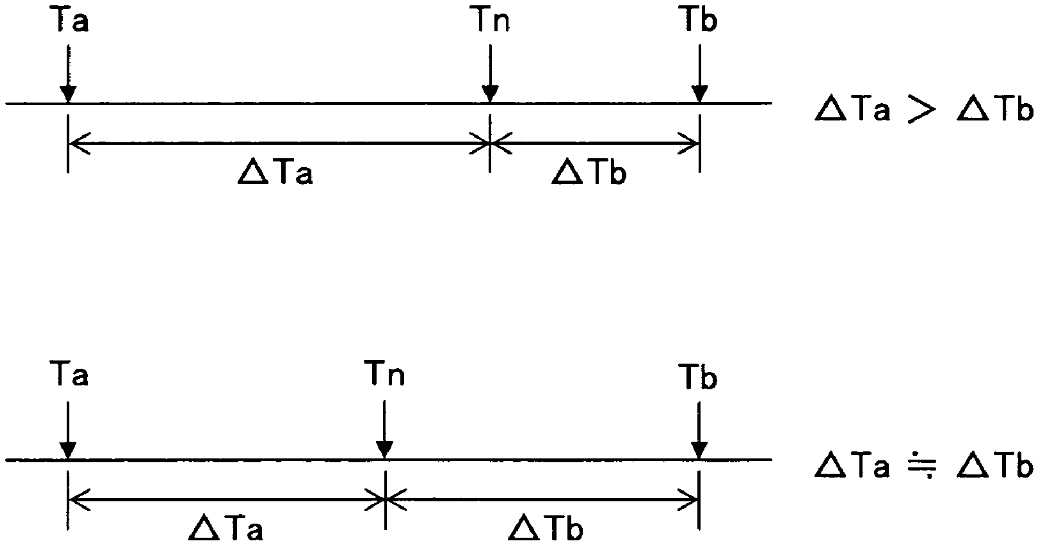
FIG. 5B illustrates the method of changing the time-stamp value when (ΔTa≧ΔTb)

FIG. 5 illustrates the method of changing the time stamp value. Consider, for example, a case in which the time stamp is rewritten for a packet of the AV stream. The time-stamp value Tn of the object packet Pn can be changed based on the packet Pa directly before the packet Pn and its time-stamp value Ta, and the packet Pb directly following the packet Pn and its time stamp value Tb. Specifically, when $\Delta Ta=Tn-Ta$ and $\Delta Tb=Tb-Tn$, the time-stamp value Tn can be changed so as to reduce the difference between ΔTa and ΔTb. FIG. 5A shows an increase in the time-stamp value Tn when $\Delta Ta<\Delta Tb$. FIG. 5B shows a decrease in the time-stamp value Tn when $\Delta Ta \geqq Tb$. This method is also applicable when changing the time-stamp values of packets in a multimedia data stream.

When changing the time-stamp value Tn of the packet Pn of the AV stream, the value of the clock information PCR of the packet Pn is also changed. When the time-stamp value Tn is increased, the amount of increase of the PCR may be set at an optional number which does not exceed Tb after the increase. Alternatively, the PCR value may be increased by the minimum interval of change Ti of the time stamp. Another alternative is to increase the PCR value only by (packet size÷(AV stream bit rate+data stream bit rate)). A similar effect is obtained when the time-stamp value Tn is decreased.

Process Flow (1) Main Routine

Figure 6:
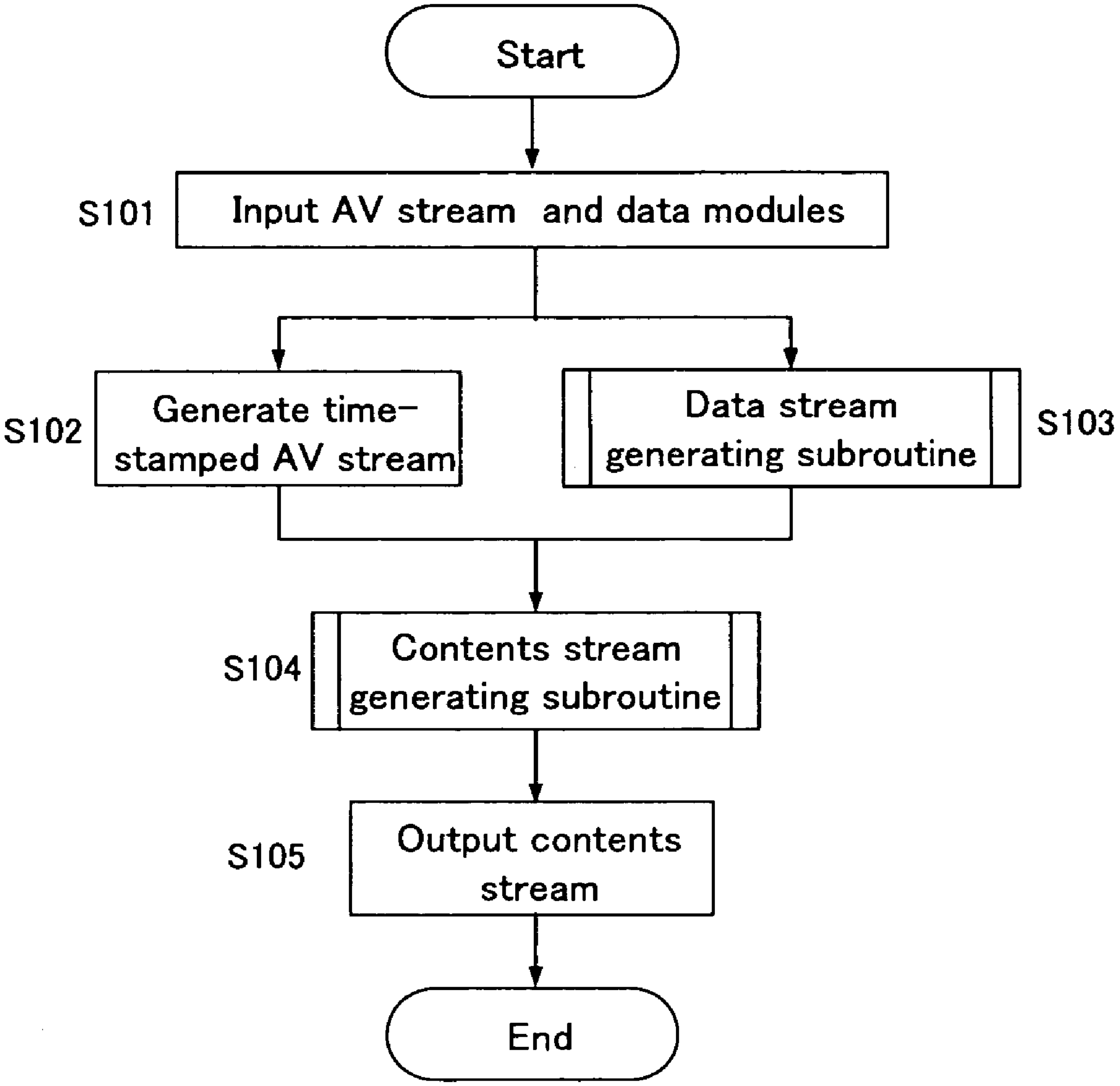
FIG. 6 is a flow chart showing an example of the flow of the main routine performed by the contents generator.

FIG. 6 is a flow chart showing an example of the flow of the main routine executes by the contents generator 100.

Step S101: the contents generator 100 receives an AV stream and multimedia data stream, in this example, the input of data modules. The transmission time and data transmission bit rate of the data modules are also input.

Step S102: the contents generator 100 generates a time-stamped AV stream by the AV stream generating means 101.

Step S103: the contents generator 100 generates a time-stamped multimedia data stream by the data stream generating subroutine executed by the data stream generating means 102. Details of this process are described later.

Step S104: the contents generator 100 generates a time-stamped contents stream by the contents stream generating subroutine executed by the contents stream generating means 103. Details of this process are described later.

Step S105: The contents generator 100 outputs a contents stream generated by the contents stream generating means 103.

(2) Data Stream Generating Process Subroutine

Figure 7:
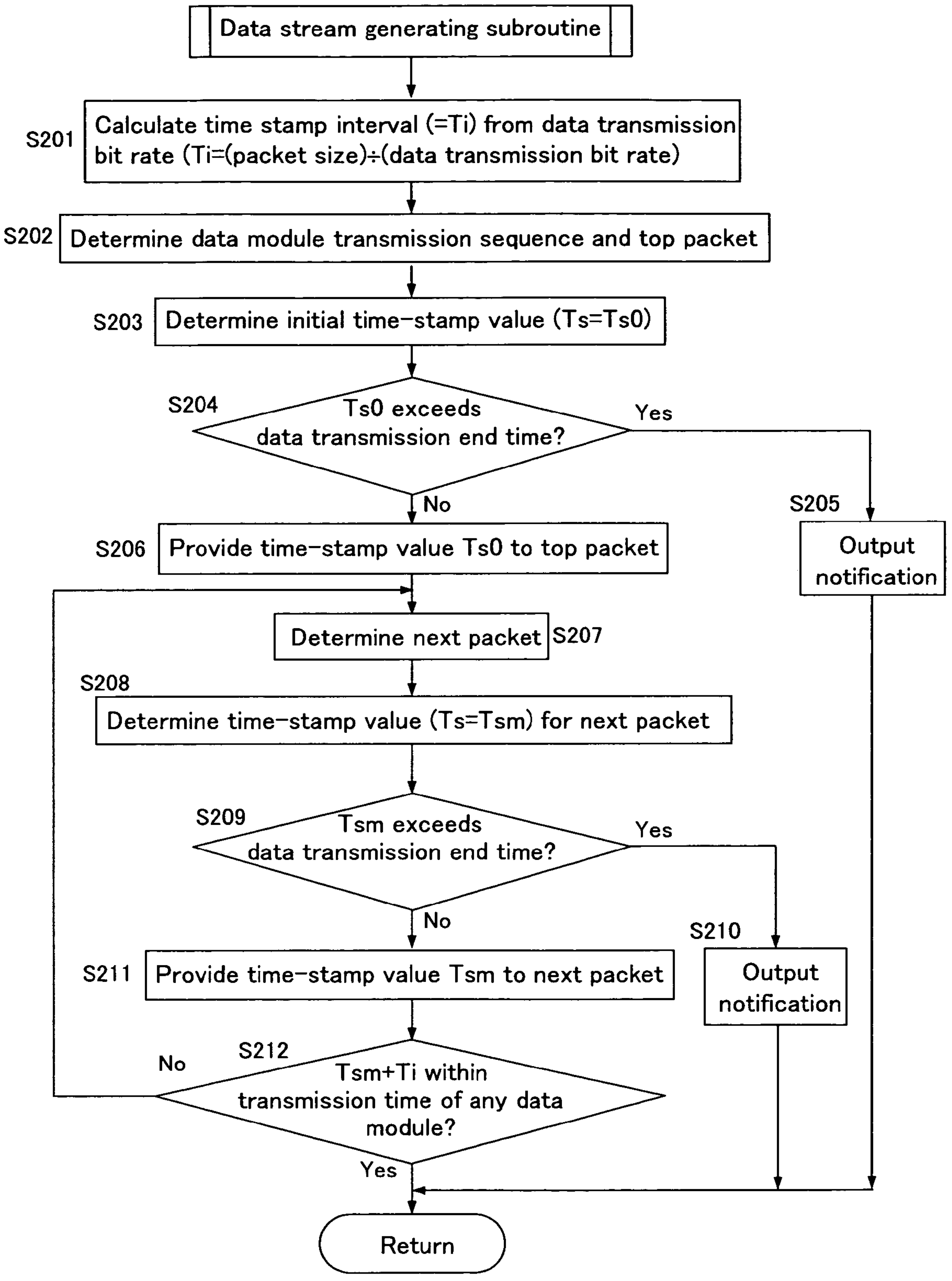
FIG. 7 is a flow chart showing an example of the process flow of the data stream generating subroutine started in the main routine.

FIG. 7 is a flow chart showing an example of the process flow of the data stream generating subroutine started in the main routine. This process is executed by the data stream generating means 102. This process provides a different time stamp for every packet included in each data module.

Step S201: The data stream generating means 101 calculates a time stamp interval Ti based on the equation below.

$$Ti=(\text{Packet size})\div(\text{data transmission bit rate})$$

Step S202: The data stream generating means 101 determines the data module transmission sequence, and determines the top packet based on the determined transmission sequence. The top packet is the first packet when the top data module is packetized. The data module transmission sequence may be optional, or may be determined in accordance with specific rules established beforehand. For example, the transmission sequence may be determined in ascending order from the lowest value data module ID and version ID. Furthermore, an order may be determined to transmit all data modules in one cycle, and the transmission of a second and subsequent cycle of each data module starting from the second cycle may be in the same order as the first cycle.

Step S203: The data stream generating means 101 determines an initial value Ts0 of the time stamp Ts. As previously mentioned, the initial value Ts0 of the time stamp Ts is determined by the initial value of the time stamp of the AV stream and the transmission start time of each data module.

Steps S204 and S205: The data stream generating means 101 determines whether or not the initial value Ts0 of the time stamp exceeds the transmission end time of the top data module (S204). Since the data module cannot be transmitted when the transmission end time is exceeded, the user is notified by outputting sound or a screen indicating that condition (S205), and the process ends. If the time represented by the time-stamp initial value Ts0 does not exceed the transmission end time of the top data module, the process continues.

Step S206: The data stream generating means 101 records the time-stamp value Ts0 in the header of the top data packet.

Step S207: The data stream generating means 101 determines the next packet. The next packet is selected from the packets of the packetized data module based on the data module transmission sequence.

Step S208: The data stream generating means 101 determines the time-stamp value Tsm for the next packet. Tsm is a value obtained by adding Ti to the time-stamp value provided for the previous packet. When the next packet is the transmission start packet of a certain data module, the time-stamp value Tsm is determined based on the data module transmission sequence and time-stamp initial value of the AV stream and the transmission start time of that data module.

Steps S209 and S210: The data stream generating means 101 determines whether or not the transmission end time of the data module to which the next packet belongs exceeds the time-stamp value Tsm (S209). Since the data module cannot be transmitted when the transmission end time is exceeded, the user is notified of this condition and the process ends (S210). When the transmission end time is not exceeded, the process continues. Even when the time-stamp value Tsm exceeds the transmission end time of the data module to which the packet belongs, a determination is made as to whether or not there is another data module whose transmission end time has not ended, and if there is such a data module, the next packet is determined based on the transmission sequence of the data module which has not reached its transmission end time.

Step S211: The data stream generating means 101 writes the time-stamp value Tsm in the header of the next packet.

Step S212: The data stream generating means 101 determines whether or not the value obtained by adding the time-stamp interval Ti to the time-stamp value Tsm (Tsm+Ti) exceeds the slowest among the transmission end times of all data modules. When the slowest transmission end time is not exceeded, the routine returns to step S207 and that process is executed. When the value Tsm+Ti exceeds the slowest transmission end time, the data cannot be transmitted and the process ends.

As described above, at least one data module is packetized, and all packets are provided with time stamps in the data module transmission sequence. These packets are combined in the time stamp sequence to generate a time-stamped multimedia data stream.

(3) Contents Stream Generating Process

Figure 8:
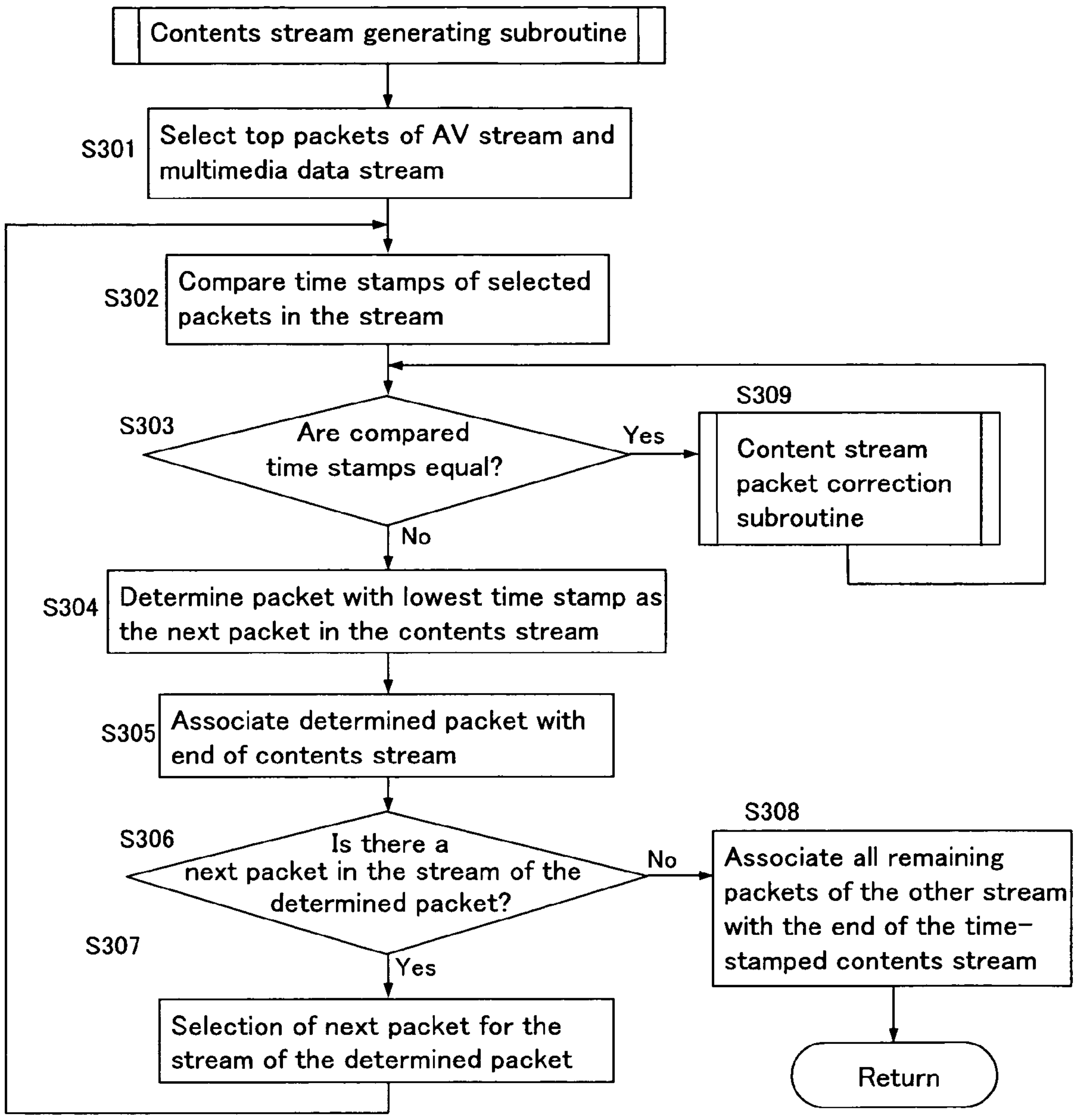
FIG. 8 is a flow chart showing an example of the flow of the contents stream generating subroutine started in the main routine.

FIG. 8 is a flow chart showing an example of the flow of the contents stream generating subroutine started in the main routine. This process is executed by the contents stream generating means 103. This process combines the AV stream and the multimedia data stream into a single contents stream.

Step S301: The contents stream generating means 103 selects the top packets of the time-stamped AV stream and the time-stamped multimedia data stream as the current packet of the respective stream.

Step S302; The contents stream generating means 103 compares the time-stamp values of the current packets selected from the respective streams.

Step S303: The contents stream generating means 103 determines whether or not the compared time-stamp values are equal.

Step S304: When the compared time-stamp values are not equal, the contents stream generating means 103 determines the current packet with the lowest time-stamp value as the next packet of the time-stamped contents stream. When the compared time-stamp values are equal, the routine continues to the next step S310.

Step S305: The contents stream generating means 103 combines the packet determined to be the next packet with the end of the time-stamped contents stream.

Step S306: The contents stream generating means 103 determines whether or not the next packet is in the stream to which the determined packet belongs. For example, when the current packet of the time-stamped AV stream is determined to be the next packet of the contents stream, the current packet of the AV stream is determined to be the next packet.

Step S307: Regarding the stream combined with the current packet determined to be the next packet of the contents stream, the contents stream generating means 103 selects the next current packet as the current packet. Thereafter, the routine returns again to step S302, and that process is repeated. Consequently, the packet of the AV stream and the packet of the multimedia data stream are arranged in time-stamp sequence.

Step S308: Regarding the stream that is not combined with the current packet determined to be the next packet of the contents stream, the contents stream generating means 103 combines all remaining packets with the end of the time-stamped contents stream. For example, when the there is not a next packet in the AV stream after the current packet of the AV stream has been combined with the end of the contents stream, all the remaining packet of the multimedia data stream are combined with the end of the contents stream. Thereafter, the routine returns to the main routine. The routine also may return to the main routine without performing this step.

Step S309: When time-stamp values of the current packet of the time-stamped AV stream and the time-stamped multimedia data stream are identical, the contents stream generating means 103 changes the time stamp of one or the other of the two current packets. In this example, the clock information and time stamp of the current packet of the time-stamped AV stream are changed by executing a content stream packet correction routine. Details of this process are described below with reference to FIG. 9.

This process generates a contents stream in which the packets of the time-stamped AV stream and the time-stamped multimedia data stream are arranged in time-stamp sequence.

(4) Content Stream Packet Correction Process

Figure 9:
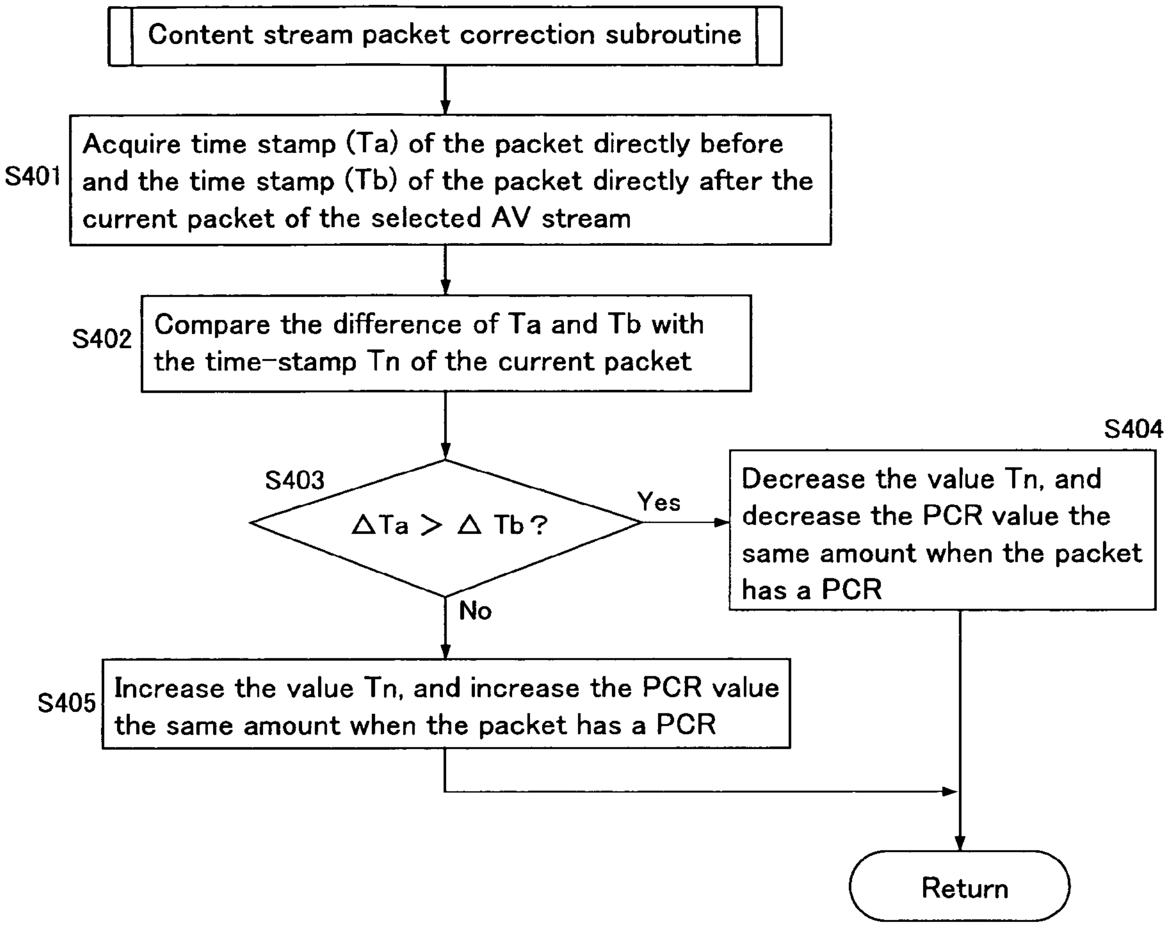
FIG. 9 is a flow chart showing an example of the process of the contents stream packet correction subroutine started by the contents stream generating subroutine.

FIG. 9 is a flow chart showing an example of the content stream packet correction process started in the main routine.

Step S401: The contents stream generating means 103 obtains the respective time-stamp values Ta and Tb from the packet Pa directly before and the packet Pb directly after the current packet Pn of the time-stamped AV stream.

Step S402: The contents generating means 103 compares the difference Ta between the time-stamp values Tn and Ta, and the difference ΔTb between the time-stamp values Tn and Tb of the current packet (ΔTa=Tn−Ta; ΔTb=Tb−Tn).

Step S403: The contents stream generating means 103 determines whether ΔTa>ΔTb.

Step S404: The contents stream generating means 103 increases the time-stamp value Tn when ΔTa>ΔTb. Then, the PCR value recorded in the same packet is similarly increased.

Step S405: The contents stream generating means 103 decreases the time-stamp value Tn when ΔTa≦ΔTb. Then, the PCR value recorded in the same packet is similarly decreased.

As described above, time-stamp conflicts are eliminated by, for example, changing the clock information and time stamp of the current packet of the AV stream even when there is a conflict between the time stamps of the time-stamped AV stream and the time-stamped multimedia data stream. Furthermore, conflicts can also be eliminated by changing the time-stamp value of the current packet of the multimedia data stream by a similar method.

Second Embodiment

The contents generator 100 of a second embodiment receives a change in the data module transmission sequence. The contents generator 100 has the same functional structure as the first embodiment, but provides an additional function of receiving a change in the data module transmission sequence to the functions of the data stream generating means 102.

Figure 10:
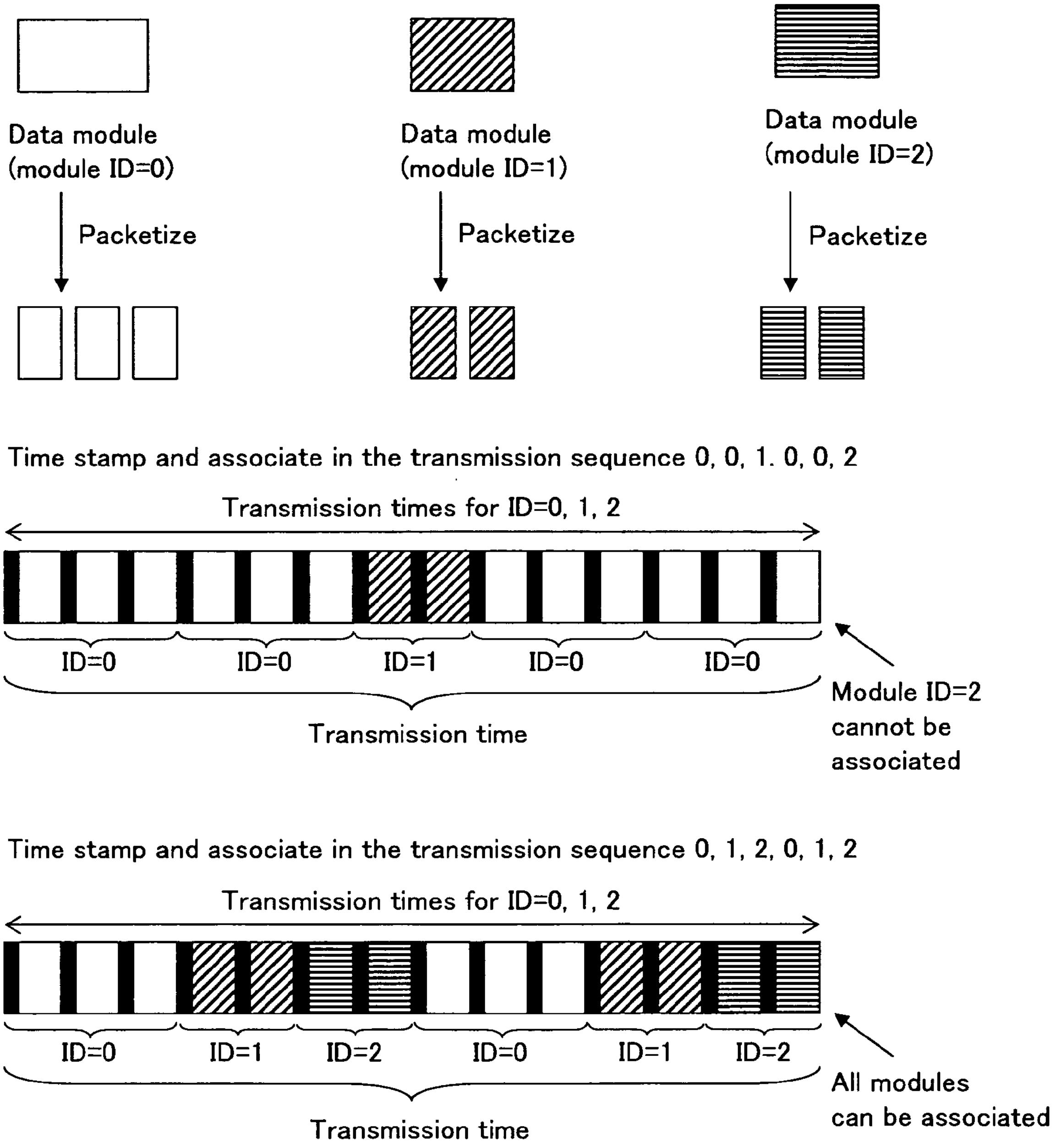
FIG. 10 is a conceptual drawing showing the additional functions of the data stream generating means 102 of the second embodiment.

FIG. 10 is a conceptual illustration showing the added function of the data stream generating means 102 of the second embodiment. The data stream generating means 102 determines the transmission sequence of the data module of a specified transmission time, and receives a change of the transmission sequence when all data modules cannot be transmitted by that sequence. For example, FIG. 10 shows an example of a change of the transmission sequence data modules (ID=0, 1, 2) when their transmission times completely overlap. Although the initial transmission sequence is determined as [0], [0], [1], [0], [0], [2], a time-stamp cannot be provided for the data module (ID=2) within the transmission time in this transmission sequence. In this case, the data module (ID=2) cannot be transmitted within the transmission time. Therefore, a new transmission sequence of, for example, [0], [1], [2], [0], [1], [2] is determined. A time stamp within the transmission time can be provided for all modules in this new transmission sequence. The new transmission sequence may be set by the data stream generating means 102, or may be set by the user.

Figure 11:
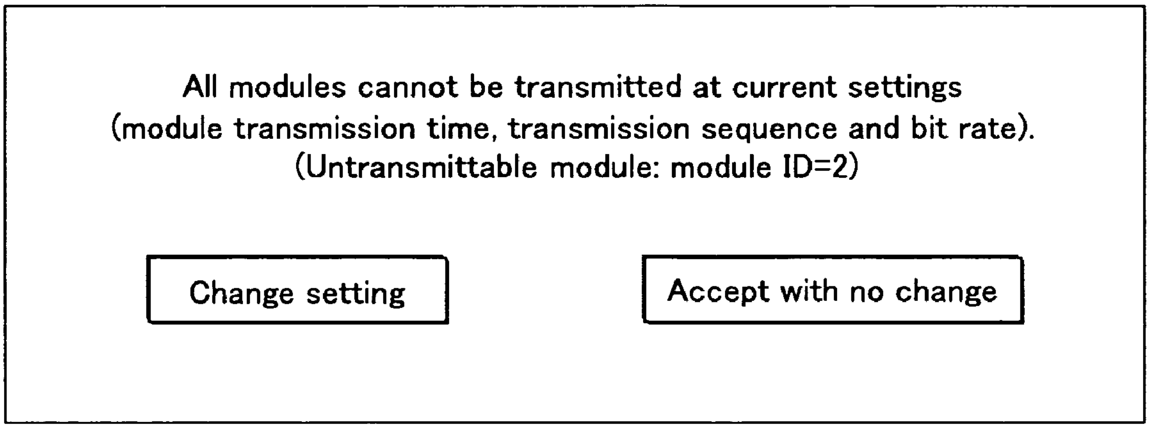
FIG. 11 is an example of a screen for receiving a change of the data module transmission sequence.

FIG. 11 is an example of a screen showing the reception of the data module transmission sequence. The data stream generating means 102 outputs this screen when it determines that a time stamp cannot be provided within the transmission time for any data module. When the [Change Setting] button is pressed, the data stream generating means 102 generates a new transmission sequence. The user also may also receive the setting of the transmission sequence when a data module transmission sequence changing screen is displayed (not shown in the drawing).

Figure 12:
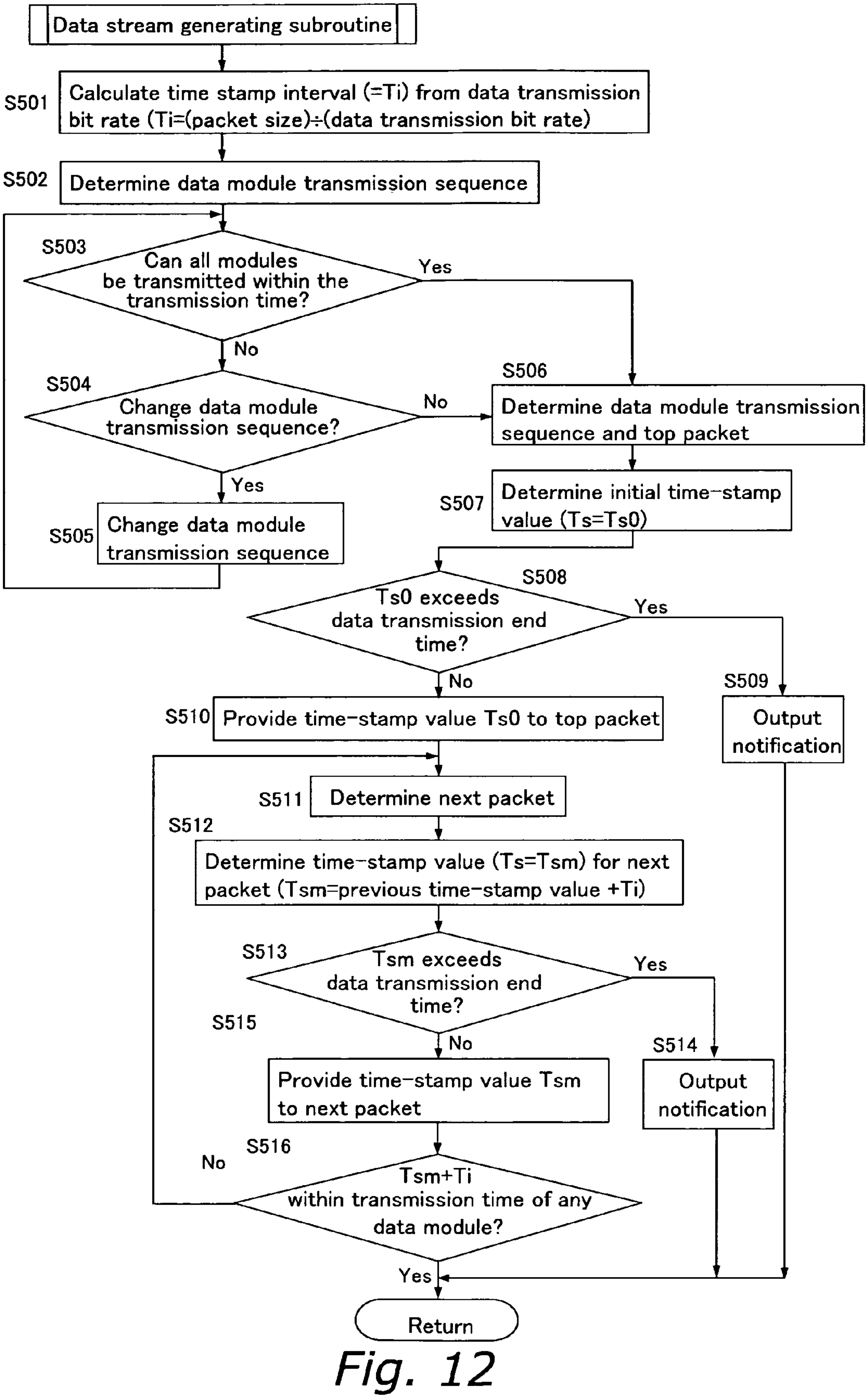
FIG. 12 is a flow chart showing an example of the process flow of the data stream generating subroutine of the second embodiment.

FIG. 12 is a flow chart showing an example of the process flow of the data stream generating subroutine of the second embodiment. The contents generator 100 of the second embodiment executes a process for replacing the data stream generating subroutine performed by the contents generator 100 of the first embodiment with the process described below.

Step S501: The data stream generating means 102 calculates the interval Ti of the time stamp in the same manner as the first embodiment.

Step S502: The data stream generating means 102 determines the data module transmission sequence in the same manner as the first embodiment.

Step S503: The data stream generating means 102 determines whether or not a data module can be transmitted a minimum of at least once within the transmission time of each data module in the determined data module transmission sequence.

Step S504: When a time stamp within the transmission time cannot be provided for any data module, the data stream generating means 102 inquires of the user whether or not to change the data module transmission sequence. This inquiry is accomplished, for example, by displaying a screen showing the example of FIG. 11. When there is a change in the transmission sequence, the routine moves to step S505, and when there is no change, the routine moves to step S506 described later.

Step S505: The data stream generating means 102 generates a new transmission sequence and again repeats the determination of step S503 according to instructions from the user, or in the same manner as the first embodiment.

Step S506: When time stamps within the respective transmission times can be provided for all data modules, and when there is no change to the transmission sequence, the data stream generating means 102 confirms the data module transmission sequence and determines the top packet in the same manner as the first embodiment.

Steps S507~S516: The processes after the transmission sequence has been determined are identical to the processes of steps S203~S212 in the first embodiment. That is, the data stream generating means 102 arranges the packets generated from the data modules in accordance with the transmission sequence, and provides time stamps in that order.

According to this process, a user is aware whether or not all data modules are included in the time-stamped contents stream before the content stream is generated.

Third Embodiment

In the third embodiment, a case is considered in which information specifying the transmission clock (hereinafter referred to as 'event message') is input as a multimedia data file. The functional structure of the contents generator 100 is similar to the first embodiment with the exception of the aspects described below.

FIG. 13 shows an example of the transmission clock of an input event message. The transmission clock specifies the time in the time base of the AV stream. In this example, the transmission clock of the event message is specified by specifying the relative time in units of seconds using the top of the AV stream as a reference. For example, the transmission clock of the event message ID [1] is a time point 100 seconds after the start of the AV stream. The event message ID and event message version are both combined to specify the event message.

Figure 14:
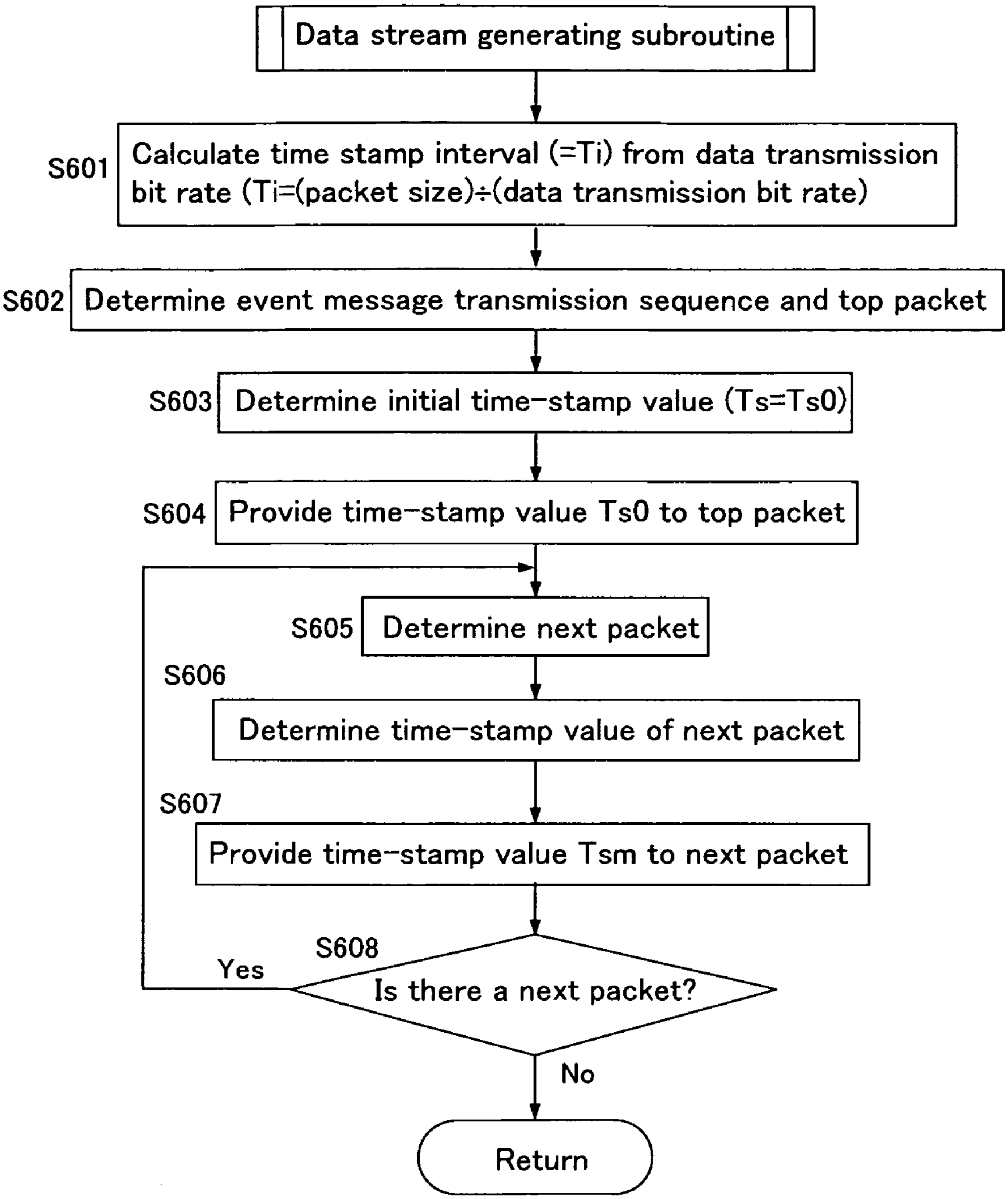
FIG. 14 is a flow chart showing an example of the process flow of the data stream generating subroutine of a third embodiment.

FIG. 14 is a flow chart showing an example of the flow of the data stream generating process subroutine in the third embodiment. The contents generator 100 of the third embodiment executes a process for replacing the data stream generating subroutine in the processes performed by the contents generator 100 of the first embodiment with the process described below.

Step S601: The data stream generating means 101 calculates the time stamp interval Ti in the same manner as the first embodiment.

Step S602: The data stream generating means 101 determines the event message transmission sequence, then determines the top packet based on this transmission sequence. The event message transmission sequence is the transmission clock sequence of each event message. The top packet is the first packet when the top event message is packetized.

Step S603: The data stream generating means 102 determines the initial time-stamp value (Ts0). The initial time-stamp value Ts0 is determined by the transmission clock of the top event message and the initial time-stamp value of the AV stream.

Step S604: The data stream generating means 102 records the time-stamp value Ts0 in the packet header of the top packet.

Step S605: The data stream generating means 102 determines the next packet. The next packet is selected from among the packets of the packetized event messages based on the event message transmission sequence.

Step S606: The data stream generating means 102 determines the time-stamp value Tsm of the next packet. When the next packet is generated from the same event message as the previous packet, the value Tsm is a value obtained by adding the time-stamp interval Ti to the time-stamp value provided to the previous packet (Tsm=(previous packet time-stamp value)+Ti). When the next packet is generated from an event message which is different than the previous packet, the next packet time-stamp value Ts is determined by the initial time-stamp value of the AV stream and the transmission clock of the event message of in which the packet originated.

Step S607: The data stream generating means 102 records the time-stamp value Ts in the packet header of the next packet.

Step S608: The data stream generating means 102 determines whether or not there is a next packet. When there is a next packet, the routine returns to step S606, and the process of providing a time stamp for the next packet is repeated. When there is not a next packet, the process ends and the routine returns to the main routine.

As described above, a multimedia data stream is generated by providing time stamps for all event messages, and combining the transmission sequence of the event message.

Fourth Embodiment

The first and second embodiments have been described by way of examples in which the data transmission bit rates are identical for all modules. However, there are cases in which the data transmission bit rate is different for each data module. In this case, the determination of the data module transmission sequence and the determination of the top packet (S202) are unnecessary in the data stream generating subroutine shown in FIG. 7. Instead, the data stream generating means 101 independently performs the data stream generating process omitting step S202 for each data module.

Figure 15:
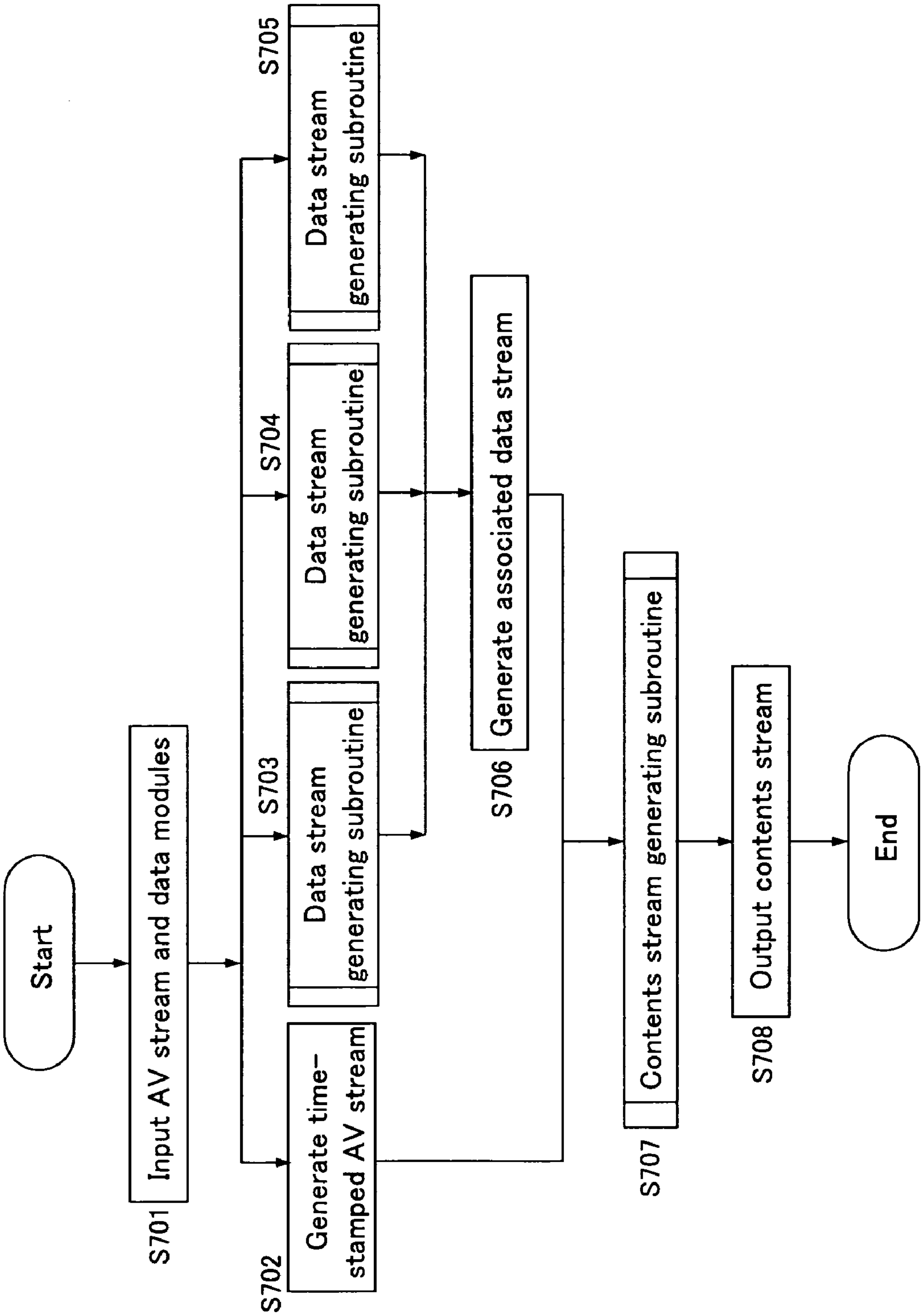
FIG. 15 is a flow chart showing an example of the flow of the main routine in a fourth embodiment.

FIG. 15 is a flow chart showing an example of the flow of the main routine performed by the contents generator 100 of the fourth embodiment. The example in the drawing shows different data transmission bit rates for three data modules. When the contents generator 100 receives the input AV stream and data modules (S701), a time-stamped AV stream is generated in the same manner as the first embodiment (S702). The data stream generating means 102 generates respective time-stamped streams from each data module (S703 and S704). Then, the data stream generating means 102 combines these streams based on the time stamps, and generates a time-stamped combined data stream (S706). This time, when there is a time stamp conflict, one of the conflicting time-stamp values is changed as described in the first embodiment. The combined data stream is output to the contents stream generating means 102, and combined with the AV stream as described in the first embodiment, and a single contents stream is generated and output (S707 and S708).

This process generates a contents stream which can synchronize the output of the AV stream and the data modules even when a plurality of data modules have different transmission bit rates.

Fifth Embodiment

General Structure

Figure 16:
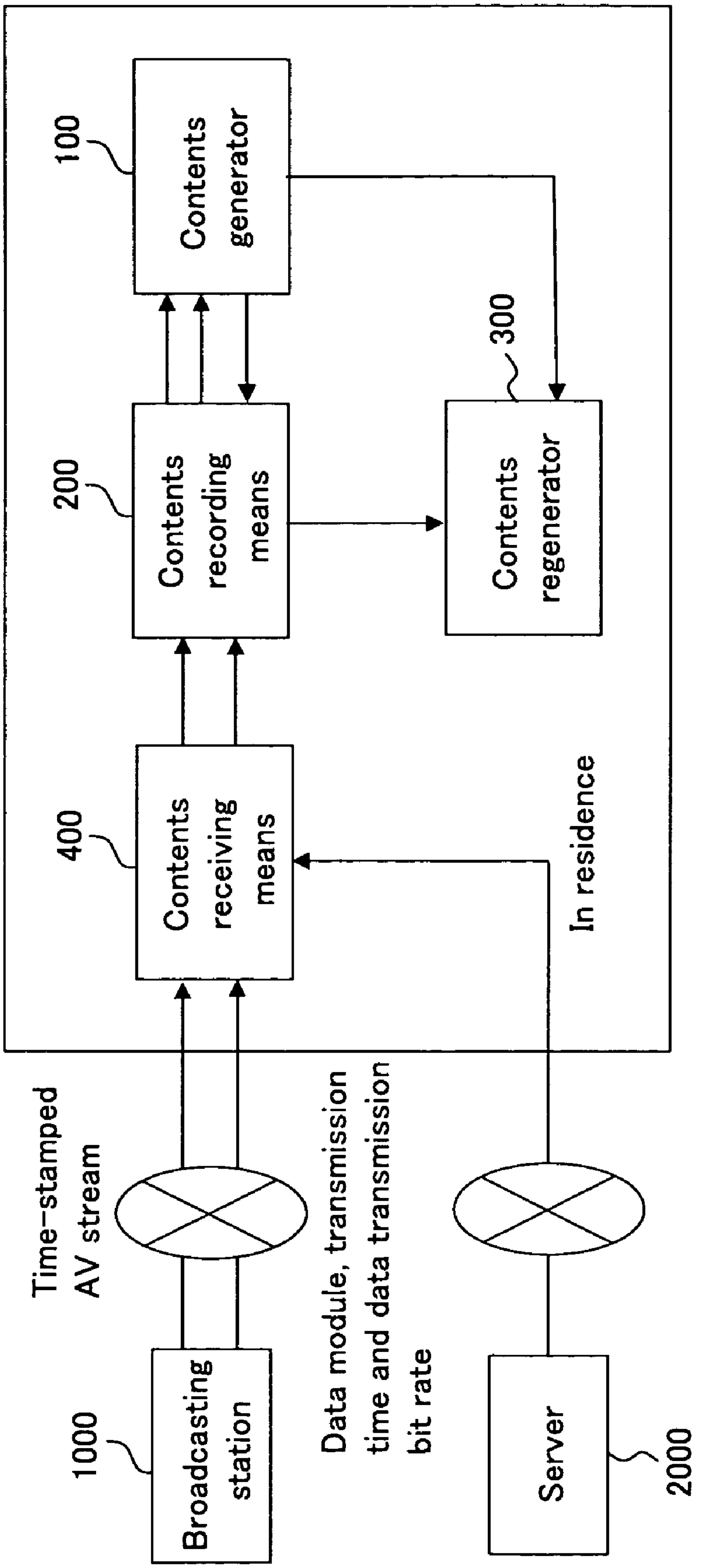
FIG. 16 is a structural view of a digital broadcasting system which includes the contents generator of a fifth embodiment.

FIG. 16 shows an example of a digital broadcasting system which includes a contents generator of a fifth embodiment. The digital broadcasting system includes a broadcast station 1000 for digital TV broadcasts, and devices installed within the homes of viewers. A contents generator 100, contents recording means 200, contents presenting means 300, and contents receiving means 400 are installed within the homes of the viewers. The contents generator 100, contents recording means 200, contents presenting means 300, and contents receiving means 400 may be separate devices, or may be provided in part or on whole in the same computer system.

The digital broadcasting system operates as described below. A broadcast station 1000 transmits time-stamped AV streams and multimedia files, such as data modules and the like. The data transmitted from the broadcast station 1000 is received by the contents receiving means 400. The data received by the contents receiving means 400 is stored in the contents recording means 200, and the stored data are input to the to the contents generator 100. The contents generator 100 generates a contents stream as described in the first embodiment. The generated contents stream is presented and output by the contents presenting means 300.

The contents receiving means 400 need not necessarily receive the multimedia data, such as data modules and the like, over the same network as the AV stream. Consider, for example, multimedia data received from a server 2000 over the internet. In this example, when data modules cannot be received over a digital broadcast network, the contents receiving means 400 may request and receive the transmission of multimedia data from the server 2000 over the internet.

In this example, the broadcast station 1000 transmits time-stamped AV streams, however AV streams which are not time stamped may also be transmitted. In the following description, time-stamped AV streams and AV streams which are not time stamped are not specifically differentiated, and both cases are referred to as AV streams.

Contents Generator (1) Functions

The functions of the contents generator 100 are basically identical to those of the first through third embodiments. That is, the contents generator 100 provides time stamps for the AV stream, generates multimedia data streams, and generates a content stream based on the generated time stamps and data streams.

In the present embodiment, the AV stream generating means 101 may be omitted from the contents generator 100 when a time stamp is always included in the AV stream received by the contents receiving means 400. Conversely, the contents generator 100 provides a time stamp for each packet of the AV stream when an AV stream without time stamps is received. In a system which receives both types of AV streams, the function of determining whether or not a received AV stream is time stamped may be included in the AV stream generating means 101.

The methods of generating a multimedia data stream and contents stream are identical to those described in the first embodiment.

(2) Contents Stream Generation Timing

Various modes of the timing for generating the AV stream, multimedia data stream, and contents stream are considered. Examples are described below.

(2-1) Generation Timing 1

The AV stream, multimedia data stream, and contents stream are generated with a timing which can be presented by the contents presenting means 300. First, the data received by the contents receiving means 400 are immediately stored in the contents recording means 200. Thereafter, when, for example, a presentation instruction is received by the contents presenting means 300, the contents generator 100 reads the AV stream and data modules from the contents recording means 200, and generates multimedia data streams and combines them to generate a content stream. The contents recording means 200 also may store the generated contents stream. Since content stream synthesis requires processing time from the instruction for presentation until the execution of presentation, a message to the user or a standby message display may be output.

Since this method performs data reception and contents generation by separate timings, the processing load is not concentrated anywhere in the means 200, 300, 400, or the contents generator 100. An advantage is that the load on the CPU is not great when the means 200, 300, 400, and contents generator 100 are provided in the same computer system.

(2-2) Generation Timing 2

The content stream may also be immediately generated when the contents generator 100 receives the AV stream and data modules. That is, the contents generator 100 generates the contents stream from the AV stream and data modules as soon as reception is completed without waiting for a presentation instruction. This method has the advantage of reducing the user waiting time from the moment the user issues an instruction to present the contents until the presentation starts.

Furthermore, there are two generation methods described below according to the reception timing of the AV stream and data modules. One method is used when the AV stream and the data modules are received with separate timing, that is, asynchronous reception. In this case, a time-stamped AV stream is generated after complete reception of the AV stream without a time stamp, and a multimedia data stream is generated after complete reception of the data modules. The complete reception of the AV stream and the data modules may be from the beginning to the end of the AV stream, and the reception of one carousel of data modules. If the reception of one carousel of data modules is viewed as a completed data module reception, a multimedia data stream can be generated by the quantity of data and minimum time. After the time-stamped AV stream and multimedia data stream have been generated, a contents stream is generated in the manner previously described. When this method is used, the contents generator 100 may also have the function of monitoring whether or not the generation of both the AV stream and the multimedia data stream have ended.

Another method is used when the AV stream and data modules are received at the same time, that is, synchronous reception. In this case, a time-stamped AV stream may be generated after complete reception of the AV stream which is not time stamped, and the multimedia data stream may be generated after complete reception of the data modules. In this method, the start of the AV stream generation and the start of the multimedia data stream generation of offset, For example, the multimedia data stream may be generated during the reception of the AV stream. This method reduces the time for the complete generation of the contents stream since the generation of the multimedia data stream starts without waiting for the complete reception of the AV stream. When this method is used, the contents generator 100 may also have the function of monitoring whether or not the generation of both the AV stream and the multimedia data stream have ended.

(2-3) Generation Timing 3

The contents generator 100 can synthesis the content stream when any of the means 200, 300, or 400 are not operating after the contents receiving means 400 completes reception of data and the contents recording means 200 has completed data recording. It is desirable that the contents generator 100 has the function of determining the operating condition of each means 200, 300, and 400 when executing this method.

Since data reception, contents stream generation, and data presentation are performed with separate timing, this method avoids a concentration of the processing load on the means 200, 300, 400 and contents generator 100, and uses the CPU efficiently. An advantage is that the load on the CPU is reduced and the CPU is used efficiently when the means 200, 300, 400, and contents generator 100 are provided in the same computer system.

(3) Process Flow

Figure 17:
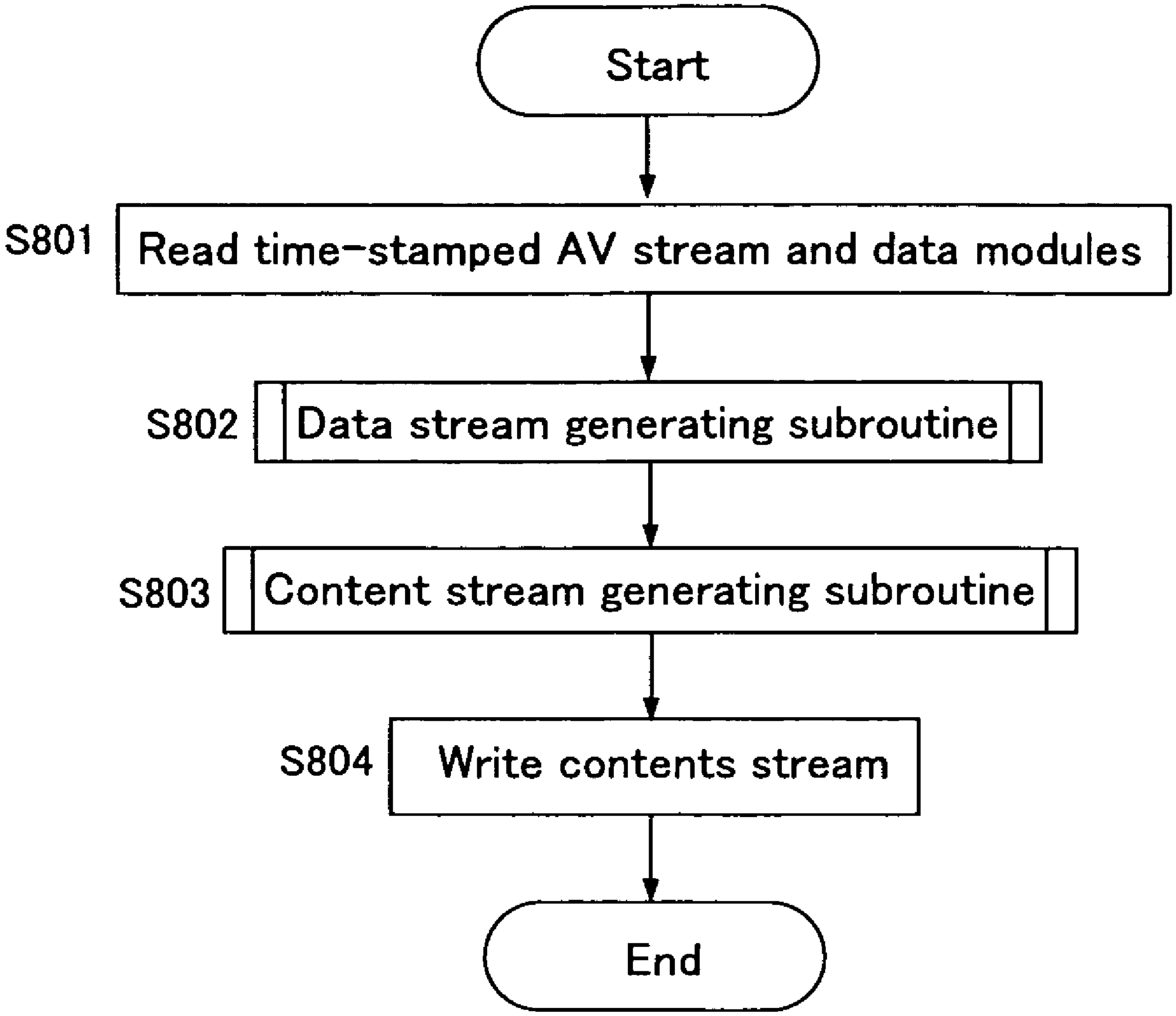
FIG. 17 is a flow chart showing an example of the flow of the main routine performed by the contents generator of FIG. 16.

FIG. 17 is a flow chart showing an example of the flow of the main routine performed by the contents generator 100 of the present embodiment. This example describes a case in which the contents receiving means 400 receives a time-stamped AV stream. The example describes the generation of a content stream using generation timing 2. That is, the description pertains to storing a time-stamped AV stream and data modules in the contents recording means 200, and performing generation without performing reception and presentation.

Step S801: The contents generator 100 reads an AV stream and multimedia data files, in this example, data modules, from the contents recording means 200. The contents generator 100 also reads the data module transmission time and data transmission bit rate from the contents recording means 200. The data module transmission time and data transmission bit rate are recorded in the contents recording means 200 together with the data modules.

Step S802: The contents generator 100 generates a time-stamped multimedia data stream by the previously described data stream generating subroutine.

Step S803: The contents generator 100 generates a time-stamped AV stream by the previously described contents stream generating subroutine.

Step S804: The contents generator 100 writes the contents stream generated by the contents stream generating means 103 to a hard disk or the like across the contents recording means 200.

The contents generator 100 of the present embodiment synthesizes the contents stream on the user side by providing the contents receiving means, contents recording means, and contents presenting means on the user side.

Other Embodiments (a) When data modules and event messages are input as multimedia data files, there may be time-stamp conflicts among the data module packets and the event message packets. If contents stream generation is based on the condition that separate transmission identifiers are allocated to the data module stream and the event message stream, any of the time-stamp values may be changed using the method previously described in the first embodiment.

Conversely, contents stream generation may be based on the condition that the same transmission identifiers are allocated to the data module stream and the event message stream. Specifically, in digital television broadcasts, the same PID is provided to the data module stream and the event message stream. In this case, the following two resolution methods are considered when the attachment position of the combining position of the event message packets is within one segment of the data module stream. One method shifts the time-stamp values of all packets of the segment to values larger than the time stamp of the event messages. Another method shifts the time-stamp values of the event messages so as to be behind all packets of the segment. The former method has the advantage of allowing presentation without shifting the event messages from a desired timing. Another advantage is that the combination of the data modules and event messages can be within the standard range of digital television broadcasts.

In this case a segment is a unit of transmitted data modules, and includes a plurality of packets. For digital television broadcasts, one segment is 4096 bytes.

(b) The contents generator also may be provided both within the users residence and at the broadcasting station. Providing the contents generator at both locations makes possible the following processes, for example. A contents stream is broadcast from the broadcasting station. The contents stream is received on the user side, and resolved into a time-stamped AV stream and multimedia data stream, which are stored in the contents recording means 200. The user side synthesizes and outputs the time-stamped AV stream and multimedia data stream with a predetermined timing, for example, presentation time.

(c) The above embodiments may be used in combinations as necessary.

(d) Computer-executable programs for realizing these methods, and computer-readable recording media for recording these programs are included within the scope of the present invention. Examples of computer-readable media include flexible disks, hard disks, CD-ROM, MO, DVD, DVD-ROM, DVD-RAM, BD (Blue-ray disc), and semiconductor memories.

The computer program is not limited to a program recorded on a recording medium, and may be transmitted over an electric communication line, wireless or wired communication line, or a network such as the internet and the like.

INDUSTRIAL APPLICABILITY

In contents stream generation based on the condition of recording, the invention is applicable to contents generators capable of synchronizing the AV stream and multimedia data, and is particularly applicable to devices which generate time-stamped streams.

This application claims priority to Japanese Patent Application No. 2004-120427. The entire disclosure of Japanese Patent Application No. 2004-120427 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A contents generator for generating a time-stamped AV stream from an AV stream which is a packet stream including packetize/d video and/or audio data, the contents generator comprising:

a packetizing unit for packetizing at least one multimedia data file;

a time-stamp generating unit for generating a time stamp indicating the presentation timing of each packet which has been packetized by the packetizing unit based on the multimedia data file transmission time, data transmission bit rate, and the AV stream time stamp and/or based on the multimedia data file transmission clock and AV stream time stamp;

a multimedia data stream generating unit for generating a time-stamped multimedia data stream sharing the time base of the time-stamped AV stream by providing a time stamp generated by the time-stamp generating unit to each packet corresponding to that time stamp; and a time-stamped content stream generating unit for generating a time-stamped content stream by combining the time-stamped AV stream and the time-stamped multimedia data stream based on the time stamps of the time-stamped AV stream and the time-stamped multimedia data stream, wherein:

clock information indicating the presentation timing of packets is recorded for a plurality of packets among all packets of the AV data stream, and the AV stream time stamp is generated based on the clock information;

the time-stamped content stream generating unit compares a time-stamp value Tn provided for the packet Pn of the time-stamped AV stream and a time-stamp value Tm provided for the packet Pm of the time-stamped multimedia data stream, and, when both values Tn and Tm are equal, changes the clock information and the time-stamp value Tn of the packet Pn of the time-stamped AV stream; and the time-stamped content stream generating unit further extracts a time-stamp value Ta of a packet Pa directly before and the packet Pn of the time-stamped AV stream and a time-stamp value Tb of a packet Pb directly after the packet Pn of the time-stamped AV stream, and changes the time-stamp value Tn of the packet Pn based on the time-stamp values Ta and Tb.

2. The contents generator of claim 1, wherein the multimedia data stream generating unit receives transmission sequence settings of the multimedia data files when there are a plurality of multimedia data files.

3. The contents generator of claim 1, wherein the multimedia data stream generating unit determines the transmission sequence of multimedia data files when there are a plurality of multimedia data files for which a transmission time has been specified, and determines whether or not the time indicated by the packet time stamp generated from each multimedia data file is within the transmission time of that multimedia data file when a time-stamped multimedia data stream has been generated in that transmission sequence.

4. The contents generator of claim 1, wherein the time-stamped content stream generating unit changes the clock information and the time-stamp value T1*n* of the packet P1*n* of the time-stamped AV stream only relative to the same time base of the content stream.

5. The contents generator of claim 1, wherein the time-stamped content stream generating unit changes the time-stamp value Tn of the packet Pn so as to reduce a difference between a difference ΔTa (ΔTa=Tn−Ta) of the time-stamp values Ta, Tn of the packets Pa and Pn of the time-stamped AV stream and a difference ΔTb (ΔTb=Tb−Tn) of the time-stamp values Tn, Tb of the packets Pn and Pb.

6. The contents generator of claim 1, wherein the AV stream conforms to the MPEG2 standard, and the clock information is a PCR (program clock reference).

7. A contents generator for generating a time-stamped AV stream from an AV stream which is a packet stream including packetized video and/or audio data, the contents generator comprising:

a packetizing unit for packetizing at least one multimedia data file;

a time-stamp generating unit for generating a time stamp indicating the presentation timing of each packet which has been packetized by the packetizing unit based on the multimedia data file transmission time, data transmission bit rate, and the AV stream time stamp and/or based on the multimedia data file transmission clock and AV stream time stamp;

a multimedia data stream generating unit for generating a time-stamped multimedia data stream sharing the time base of the time-stamped AV stream by providing a time stamp generated by the time-stamp generating unit to each packet corresponding to that time stamp; and a time-stamped content stream generating unit for generating a time-stamped content stream by combining the time-stamped AV stream and the time-stamped multimedia data stream based on the time stamps of the time-stamped AV stream and the time-stamped multimedia data stream, wherein the time-stamped content stream generating unit compares a time-stamp value Tn provided for a packet Pn of the time-stamped AV stream and a time-stamp value Tm provided for a packet Pm of the time-stamped multimedia data stream, and, when both values Tn and Tm are equal, changes the clock information and the time-stamp value Tm of the packet Pm of the time-stamped multimedia data stream, and the time-stamped content stream generating unit extracts a time-stamp value Tc of a packet Pc directly before the packet Pm of the time-stamped multimedia data stream and a time-stamp value Td of a packet Pd directly after the packet Pm of the time-stamped multimedia data stream, and changes the time-stamp value Tm of the packet Pm based on the time-stamp values Tc and Td.

8. The contents generator of claim 7, wherein the time-stamped content stream generating unit changes the time-stamp value Tm of the packet Pm so as to reduce a difference between a difference $\Delta Tc$ ($\Delta Tc = Tm - Tc$) of the time-stamp values Tc, Tm of the packets Pc and Pm of the time-stamped multimedia data stream and a difference $\Delta Td$ ($\Delta Td = Td - Tm$) of the time-stamp values Tm, Td of the packets Pm and Pd.

9. A contents generator for generating a time-stamped AV stream from an AV stream which is a packet stream including packetized video and/or audio data, the contents generator comprising:

a packetizing unit for packetizing at least one multimedia data file;

a time-stamp generating unit for generating a time stamp indicating the presentation timing of each packet which has been packetized by the packetizing unit based on the multimedia data file transmission time, data transmission bit rate, and the AV stream time stamp and/or based on the multimedia data file transmission clock and AV stream time stamp;

a multimedia data stream generating unit for generating a time-stamped multimedia data stream sharing the time base of the time-stamped AV stream by providing a time stamp generated by the time-stamp generating unit to each packet corresponding to that time stamp; and a time-stamped content stream generating unit for generating a time-stamped content stream by combining the time-stamped AV stream and the time-stamped multimedia data stream based on the time stamps of the time-stamped AV stream and the time-stamped multimedia data stream, wherein the multimedia data files include a data module which specifies a transmission time, and an event message which specifies a transmission clock; and wherein, when the data module and event message are allocated the same transmission identifier, the multimedia data stream generating unit streams the data module in section units of predetermined length which form one or more packets, and, when the transmission clock of the event message is included in the transmission time of any section, changes the time stamp of the event message or the time stamp of all packets of the section such that the transmission clock of the event message is then outside the transmission time of that section.

10. A content generating method for generating a time-stamped AV stream from an AV stream which is a packet stream of packetized video and/or audio data, the content generating method comprising the steps of:

(a) packetizing at least one multimedia data file;

(b) generating a time stamp indicating the presentation timing of each packet which has been packetized in step (a) based on the multimedia data file transmission time, data transmission bit rate, and the AV stream time stamp and/or based on the multimedia data file transmission clock and AV stream time stamp;

generating a time-stamped multimedia data stream sharing time base of the time-stamped AV stream by providing a time stamp generated in step (b) for each packet corresponding to the time stamp; and generating a time-stamped content stream by combining the time-stamped AV stream and the time-stamped multimedia data stream based on the time stamps of the time-stamped AV stream and the time-stamped multimedia data stream, wherein:

clock information indicating the presentation timing of packets is recorded for a plurality of packets among all packets of the AV data stream, and the AV stream time stamp is generated based on the clock information;

the generating of the time-stamped content stream includes comparing a time-stamp value Tn provided for the packet Pn of the time-stamped AV stream and a time-stamp value Tm provided for the packet Pm of the time-stamped multimedia data stream, and, when both values Tn and Tm are equal, changing the clock information and the time-stamp value Tn of the packet Pn of the time-stamped AV stream; and the generating of the time-stamped content stream further includes extracting a time-stamp value Ta of a packet Pa directly before and the packet Pn of the time-stamped AV stream and a time-stamp value Tb of a packet Pb directly after the packet Pn of the time-stamped AV stream, and changing the time-stamp value Tn of the packet Pn based on the time-stamp values Ta and Tb.

* * * * *